United States Patent [19]

Bertelli et al.

[11] Patent Number: 4,579,894

[45] Date of Patent: Apr. 1, 1986

[54] SELF-EXTINGUISHING POLYOLEFINIC COMPOSITIONS HAVING IMPROVED FLAME RESISTANCE CHARACTERISTICS AND A HIGH THERMAL STABILITY

[75] Inventors: Guido Bertelli; Renato Locatelli, both of Ferrara, Italy

[73] Assignee: Montedison S.p.A., Milan, Italy

[21] Appl. No.: 608,669

[22] Filed: May 10, 1984

[51] Int. Cl.$^4$ ............................................. C08K 5/34
[52] U.S. Cl. ..................... 524/94; 524/100; 524/101; 524/415; 524/416; 524/497
[58] Field of Search ............... 524/94, 100, 101, 415, 524/416, 497

[56] References Cited

U.S. PATENT DOCUMENTS 3,616,184 3/1968 Katagiri et al. ................... 524/497
3,635,862 1/1972 Dunn ..................................... 524/94
4,216,138 8/1980 Bost et al. ............................ 524/100

FOREIGN PATENT DOCUMENTS 23353 2/1981 European Pat. Off. ............ 524/100

Primary Examiner—John Kight
Assistant Examiner—Kriellion S. Morgan

[57] ABSTRACT

Self-extinguishing compositions comprising:
(1) from 35.5 to 87% by weight of at least a polyolefin
(2) from 5 to 20% by weight of an ammonium polyphosphate
(3) from 2 to 20% by weight of polycarbonylpiperazine
(4) from 3 to 10% by weight of melamine phosphate
(5) from 0.5 to 3% by weight of titanium dioxide
(6) from 0 to 1.5% by weight of a compound of formula R—SH wherein R is a radical of imidazole or of uracil.

4 Claims, No Drawings

SELF-EXTINGUISHING POLYOLEFINIC COMPOSITIONS HAVING IMPROVED FLAME RESISTANCE CHARACTERISTICS AND A HIGH THERMAL STABILITY

BACKGROUND OF THE INVENTION

Several methods of imparting self-extinguishing properties of the olefinic polymers are known in the art. The less recent methods include those based on the addition of the polymers with metal compounds, particularly antimony and bismuth in combination with thermally unstable halogen compounds such as, for example, the chlorinated paraffinic waxes.

Such combinations are affected, however, by serious drawbacks, such as corrosion of the equipment utilized for processing the polymeric compositions, and the emission of obscuring smokes and of corrosive and toxic gases.

More recently the research has been directed to the use of combinations free from halogen compounds and based on ammonium polyphosphates in admixture with particular nitrogenous organic compounds. They give rise, in case of combustion, to a consistent foamed carbonaceous structure, which acts as a thermal shield between flame and polymer.

Such systems exhibit, however, the drawback of possessing a limited resistance to heat and to thermo-oxidation. A certain improvement in the performances has been obtained, according to French patent application No. 2,352,857 in the name of Montedison S.p.A., with systems based on the combination of an ammonium polyphosphate with carbonylpiperazine.

An object of the present invention is particular polyolefinic compositions characterized by the combination of high levels of self-extinguishing properties with an excellent resistance to heat and to thermo-oxidation.

Such compositions comprise:
(1) from 35.5 to 87.0% by weight of an olefinic polymer or copolymer,
(2) from 5 to 20% by weight of an ammonium polyphosphate,
(3) from 2 to 20% by weight of polycarbonylpiperazine,
(4) from 2 to 20% by weight of melamine phosphate,
(5) from 0.5 to 3% by weight of titanium dioxide,
(6) from 0 to 1.5% by weight of a compound comprised in one of the following general (tautomeric) formulas:

$$R_1-S-H \qquad (I)$$

$$R_2=S \qquad (II)$$

in which:
S = a sulphur atom
$R_1$, $R_2$ = radicals selected from the groups of
(a) imidazole, where $R_1$ and $R_2$ have respectively the formula

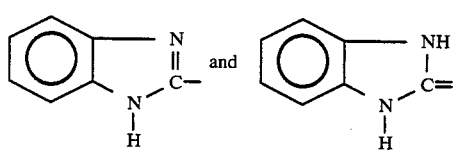

(b) uracil, with $R_1$ and $R_2$ having respectively the formula

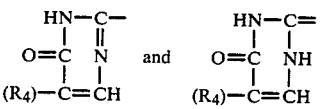

where $R_4$ = an alkyl radical containing from 1 to 4 carbon atoms, or hydrogen.

Some examples of olefinic polymers and copolymers which can form the compositions of the present invention are: polypropylene, ethylene-modified polypropylene, the mixes of polypropylene with up to 20% by weight of ethylene-propylene elastomeric copolymers, containing up to 50% by weight of copolymerized ethylene and said ethylene-propylene vulcanized elastomers.

Ammonium polyphosphates of general formula $$(NH_4)_{n+2}P_nO_{3n+1}$$

wherein n is an integer $\geq 2$ are employable; preferably, they have a molecular weight which is sufficiently high to guarantee a low water-solubility. Examples of polyphosphates are the commerical products "Exolit 263" and "Exolit 422" (manufactured by Benckise Knappsack G.m.b.H.) where n is greater than 50. Examples of compounds according to number 6 mentioned hereinbefore are mercaptobenzoimidazole, 4-methylthio-uracil and, thiouracil. The compounds according to number 6 impart prevailingly antiageing properties to the compositions forming the object of the present invention, and are therefore suited to improve their resistance to heat and to thermo-oxidation. Preferably they are used in amounts ranging from 0.5 to 1.5% by weight referred to the composition.

The compositions of the present invention are prepared according to conventional methods: for example, the polyolefin and the anti-flame additives are mixed in a Banbury vane mixer at the polyolefin plasticization temperature. The resulting mix is then extruded in a DOLCI die (screw diameter + 20 mm; length/diameter ratio of the screw = 23, screw speed = 20 rmp) at the temperature which is best suited to obtain a granulated product.

To determine the self-extinguishing properties of the polyolefinic compositions of this invention one may operated as follows: plates having a 3 mm thickness are molded from the granulated product by means of a small CARVER-type press, by operating for 7 minutes at a pressure of 40 kg/cm² and at a suitable temperature.

The self-extinguishing level was determined on the plates so prepared both by measuring (according to standard ASTM D-2836) the oxygen index, which expresses the lowest $O_2$ percentage in a $O_2/N_2$ mixture necessary for the specimen to continuously burn, and by following the UL-94 standards (published by "Underwriters Laboratories"—USA) which provide an evaluation of the plastic materials' self-extinguishing degree.

UL-94 standards contemplate various, more or less severe test conditions and permit one to classify the specimen at different self-extinguishing levels.

In the tests reported on the Table, the Vertical Burning Test has been adopted, which permits one to classify the material at the following decreasing levels: 94 V-0, 94 V-1 and 94 V-2.

Each test is carried out on a group of 5 specimens which may have a thickness of ¼, ⅛ or 1/16 inch.

The specimen, maintained in a vertical position by a proper support, is fired with flame at the lower end, and 2 lighting attempts of 10 seconds each are made.

The three above-mentioned levels of self-extinguishing power may be briefly defined as follows:

94 V-0: No specimen burns for more than 10 seconds after each flame application, and no burning particles fall therefrom. Furthermore, the total combustion time does not exceed 50 seconds for the 10 attempts made with the 5-specimen group.

94 V-1: Combustion times up to 30 seconds for each individual specimen and up to 250 seconds for the 10 attempts made with the 5-specimen group are allowed. Also at this level no specimen lets burning particles drop.

94 V-2: The allowable combustion times are the same as for level 94 V-1, but the fall of burning particles is allowed.

For the tests in oven at 150° C. with induced air circulation, from the plates there are obtained, by punching, small bars of type I, as is described in ASTM D-638: the color change evaluation is carried out visually, while the ageing test due to thermo-oxidation is effected by evaluating the embrittlement, which is coincidental with the appearing of the first pulverization point.

The following examples are given with a view to illustrating, but not to limiting, the present invention. The compositions of each example were prepared as described hereinbefore, by using a DOLCI-type die having a screw dimaeter of 20 mm, a screw's length-/diameter ratio=23, and operating at a screw speed of 20 rpm, at a temperature of 200°-240° C.

EXAMPLE 1

This example relates to compositions A through L (compositions A through C being reference compositions), not containing imidazole compounds and uracil compounds, the characteristics thereof being recorded on Table I. The amounts of the components of such compositions indicated in the table are to be considered as amounts by weight.

TABLE 1

|  | A | B | C | D | E | F | G | H | I | L |
|---|---|---|---|---|---|---|---|---|---|---|
| Formulation |  |  |  |  |  |  |  |  |  |  |
| polypropylene | 75,4 | 74,4 | 72,4 | 71,4 | 74,4 | 74,4 | 74,4 | 60 | 50 | 40 |
| (h.d.) polyethylene + $C_2/C_3$ (50/50) copolymer | — | — | — | — | — | — | — | 40 | 50 | 60 |
| ammonium polyphosphate (Exolit 422) | 18 | 18 | 18 | 18 | 15 | 13 | 10 | 10 | 10 | 10 |
| polycarbonylpiperazine | 6 | 6 | 6 | 6 | 6 | 6 | 6 | 10 | 10 | 10 |
| melamine phosphate | — | — | 3 | 3 | 3 | 5 | 8 | 10 | 10 | 10 |
| titanium dioxide | — | 1 | — | 1 | 1 | 1 | 1 | 2 | 2 | 2 |
| Irganox 1010 | 0,2 | 0,2 | 0,2 | 0,2 | 0,2 | 0,2 | 0,2 | 0,2 | 0,2 | 0,2 |
| lauryl thiopropionate | 0,4 | 0,4 | 0,4 | 0,4 | 0,4 | 0,4 | 0,4 | 0,4 | 0,4 | 0,4 |
| Self-extinguishing characteristics determined on a 3-mm thick specimen |  |  |  |  |  |  |  |  |  |  |
| Oxygen index | 31,5 | 34,0 | 33,5 | 35,5 | 35,5 | 35 | 34,5 | 35 | 34,5 | 34 |
| UL-94* | 1"10"B | 1"3" | 1"1" | 1"1" | 1"1" | 1"1" | 1"2" | 1"1" | 1"1" | 1"3" |
|  |  | 1"3" | 2"1" | 1"1" | 1"1" | 2"1" | 1"1" | 1"1" | 1"2" | 1"3" |

*reference times for 4 consecutive lightings
B = it burns completely

EXAMPLE 2

This example illustrates compositions A through G (out of which the ones from A to D reference compositions) containing compounds of imidazole and of uracil, the characteristics of which are reported on Table II.

TABLE II

|  | A | B | C | D | E | F | G |
|---|---|---|---|---|---|---|---|
| Formulation |  |  |  |  |  |  |  |
| Polypropylene | 75,4 | 74,4 | 75,4 | 74,4 | 73,4 | 73,4 | 72,4 |
| Ammonium polyphosphate (Exolit 422) | 18 | 18 | 10 | 10 | 10 | 10 | 10 |
| Polycarbonylpiperazine | 6 | 6 | 6 | 6 | 6 | 6 | 6 |
| Melamine phosphate | — | — | 8 | 8 | 8 | 8 | 8 |
| Titanium dioxide | — | 1 | — | 1 | 1 | 1 | 2 |
| Mercaptobenzoimidazole | — | — | — | — | 1 | — | 1 |
| 4-methylthiouracil | — | — | — | — | — | 1 | — |
| Irganox 1010 | 0,2 | 0,2 | 0,2 | 0,2 | 0,2 | 0,2 | 0,2 |
| Lauryl thiopropionate | 0,4 | 0,4 | 0,4 | 0,4 | 0,4 | 0,4 | 0,4 |
| Self-extinguishing characteristics on a 3-mm thick specimen |  |  |  |  |  |  |  |
| Oxygen index | 31,5 | 34 | 33 | 34,5 | 32 | 31,5 | 31,5 |
| UL-94 | 1"10"B | 1"3"1"3" | 1"2"1"1" | 1"2"1"1" | 1"1"1"1" | 1"1"1"1" | 1"1"1"1" |
| Specimen color due to ageing at 150° C. after days: |  |  |  |  |  |  |  |
| 0 | + | + | + | + | + | + | + |
| 3 | +++++ | +++ | +++++ | +++ | ++ | ++ | ++ |
| 7 | +++++ | ++++ | +++++ | ++++ | +++ | +++ | +++ |
| 14 | ++++++ | +++++ | ++++++ | +++++ | +++ | ++++ | +++ |
| 21 | ++++++ | +++++ | ++++++ | +++++ | +++ | ++++ | +++ |
| 30 | ++++++ | +++++ | • | +++++ | ++++ | +++++ | +++ |
| 45 | • | • |  | • | ++++ | • | ++++ |

TABLE II-continued

| | A | B | C | D | E | F | G |
|---|---|---|---|---|---|---|---|
| 60 | | | | | • | | • |

+ white;
++ ivory;
+++ light brown;
++++ brown;
+++++ dark brown;
++++++ black;
• pulverization

What we claim is:

1. A polymeric composition endowed with self-extinguishing characteristics when exposed to flame, comprising, by weight:
   (1) from 35.5 to 87% of at least one polyolefin,
   (2) from 5 to 20% of an ammonium polyphosphate;
   (3) from 2 to 20% of polycarbonylpiperazine;
   (4) from 3 to 10% of melamine phosphate;
   (5) from 0.5 to 3% of titanium dioxide;
   (6) from 0 to 1.5% of a compound of formula R—SH wherein R is a radical of imidazole or of uracil.

2. A composition according to claim 1, in which compound (6) is in an amount ranging from 0.5 to 1.5% by weight.

3. A composition according to claim 1, in which compound (6) is a radical of imidazole.

4. A composition according to claim 1, in which compound R is a radical of uracil.

* * * * *